June 13, 1944.  D. W. FENTRESS ET AL  2,351,416
COUPLING STRUCTURE
Filed Aug. 19, 1942
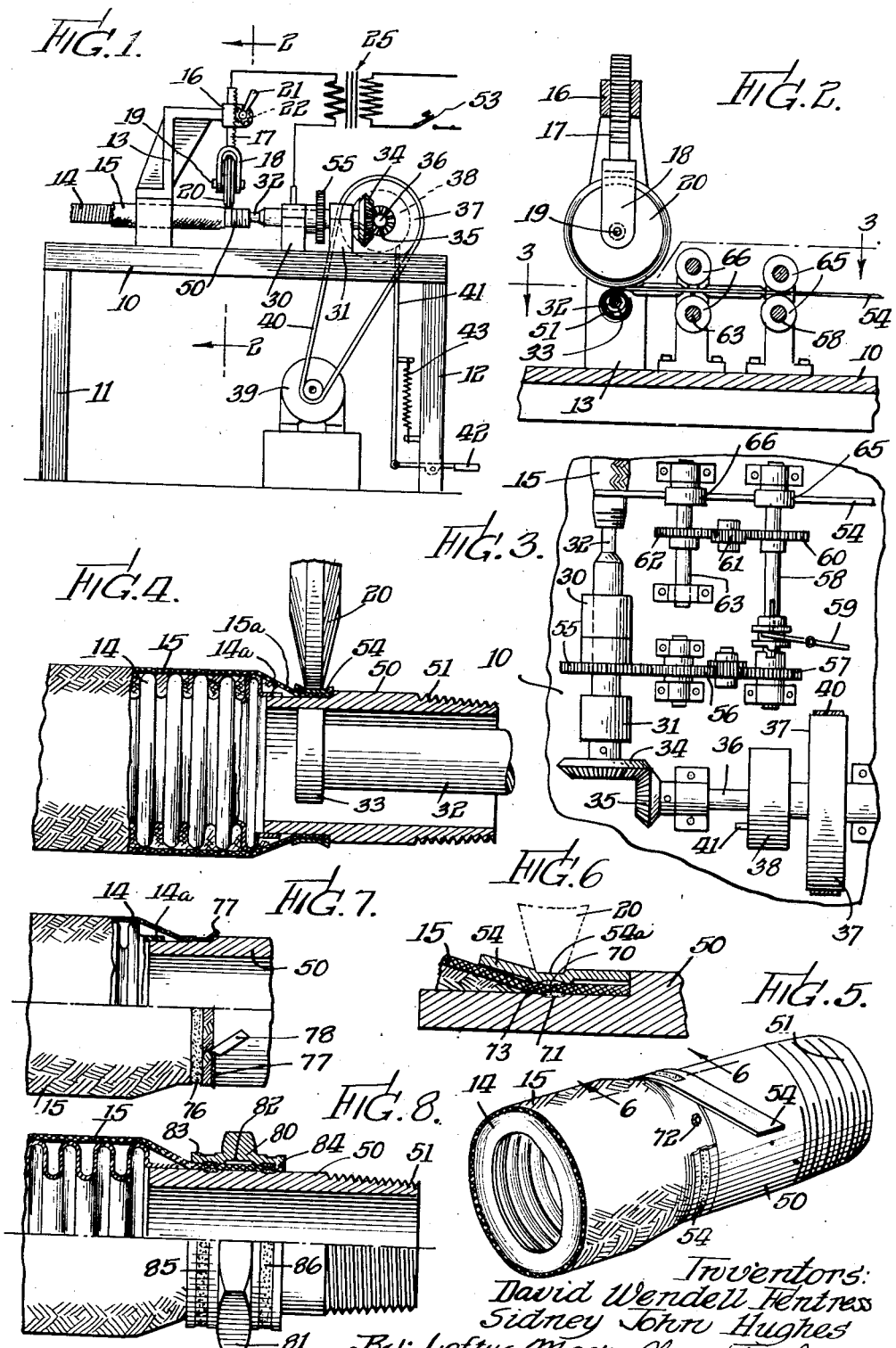
Inventors:
David Wendell Fentress
Sidney John Hughes
By: Loftus Moore Olson & Trexler attys.

Patented June 13, 1944

2,351,416

UNITED STATES PATENT OFFICE 2,351,416

COUPLING STRUCTURE

David Wendell Fentress, Barrington, Ill., and Sidney John Hughes, Belvedere Gardens, Calif., assignors to Chicago Metal Hose Corporation, Maywood, Ill., a corporation of Illinois Application August 19, 1942, Serial No. 455,278

6 Claims. (Cl. 285—72)

This invention relates to coupling structures or end connections for metal tubing, particularly flexible metal tubing encased in metal braid.

It is an object of the invention to provide a new and improved coupling structure or end connection for metal tubing of the type encased in metal braid, and more particularly to provide new and improved means for securing the braid in position.

Further objects of the invention are to provide coupling structures or end connections for braid encased tubing wherein the braid is securely held in position, but without damage or strength loss to the braid fibers, and wherein the braid acts as a reinforcing means in the structure both for strength and rigidity.

In accordance with the principles of the invention the braid is secured in position by means of a circularly disposed weld extending continuously or substantially continuously circumferentially of the coupling connection, the strength of the braid being preserved, and the braid in effect being formed into a sleeve-like construction strongly resistant to both circumferential and axial stresses. The braid ends are maintained in predetermined position in a smooth and clean manner and with a minimum of bulk.

Preferably the braid is secured by electric resistance welding, and in accordance with certain preferred embodiments is encompassed within a sleeve-like metallic body operable to cover and maintain the braid ends in position, and further the production of a sightly and efficient braid end connection. In accordance with one embodiment, this sleeve-like metallic body takes the form of a metallic ribbon wrapped around the braid end and secured in position preferably simultaneously with the formation of the braid end welded joint. In another embodiment the sleeve-like metallic body is preformed into sleeve form before application to the connection.

Other objects of the invention contemplate the arrangement of the sleeve-like braid cover, where used, in such a manner so as not to interfere with the proper welded connection between the sleeve and the braid and between the braid and the coupling piece or the like, and in accordance with one embodiment of the invention it is contemplated that the sleeve-like metallic body may be provided with wrench fittings or the like permitting the sleeve to function as a part of the coupling piece connection.

Various additional objects, advantages and features of the invention will be apparent from the following specification, when taken in connection with the accompanying drawing wherein certain preferred embodiments of the invention are set forth for the purposes of illustration and wherein one suitable form of apparatus by which the coupling structures may be formed is disclosed.

In the drawing wherein like reference numerals refer to like parts throughout:

Fig. 1 is a general assembly view, somewhat diagrammatic in character, of a welding apparatus suitable for forming the coupling structures of the present invention;

Fig. 2 is a sectional view on an enlarged scale of the apparatus shown in Fig. 1, and taken on the line 2—2 thereof;

Fig. 3 is a horizontal sectional view of the apparatus, taken on the line 3—3 of Fig. 2;

Fig. 4 is a detailed view, on a further enlarged scale, of the apparatus at the welding station, showing the welding wheels or rollers and the associated tubing and coupling parts in accordance with one form of the invention;

Fig. 5 is an illustrative perspective view showing the coupling connection of Fig. 4, during the welding operation and with the braid in partially welded condition;

Fig. 6 is a detailed view on the line 6—6 of Fig. 5;

Fig. 7 shows a modified form of construction wherein the sleeve-like braid cover is not employed; and Fig. 8 shows a further modified form of construction incorporating a different type of sleeve or cover for the welded braid end.

Referring more particularly to the drawing, and first to the illustrative apparatus shown in Figs. 1 to 3 inclusive, it will be seen that the apparatus, somewhat diagramamtically illustrated, comprises a table 10, Fig. 1, suitably supported by legs or the like 11 and 12. The table carries a bracket 13, the lower end of which is provided with an opening to rotatably receive the tubing 14 with its associated braid 15 to be welded. The upper end of the bracket is provided with a fitting 16 having an opening in which a rack member 17 is vertically reciprocable, as best shown in Fig. 2.

This rack member forms part of one of the welding electrode assemblies. More specifically, the rack carries at its lower end a yoke 18 provided with an axle 19 on which the outer electrode roller or wheel 20 is rotatably carried. To control the vertical position of the rack 17 and the associated electrode wheel, a manually operable handle 21 is provided. This handle is associated with a pinion 22 in geared engagement with the rack, the arrangement being such that rotational or oscillatory movement imparted to the handle 21 produces corresponding vertical positioning of the rack and outer electrode wheel 20. The rack is connected to one branch of the secondary of a suitable welding transformer diagrammatically indicated by the numeral 25, suitable insulating means (not shown) to this end being provided for electrically insulating the rack and its associated electrode assembly from the control handle 21 and the frame of the welding apparatus.

The table 10 also carries a pair of brackets 30 and 31, Figs. 1 and 3, for rotatably supporting a shaft 32, the end of which carries the inner electrode roller or wheel 33, as best shown in Fig. 4. The opposite end of shaft 32 is provided with a beveled gear 34 adapted to be driven from a cooperating beveled gear 35 carried by a drive shaft 36. The drive shaft is provided with a pulley 37 loosely mounted thereon, a clutch 38 being incorporated for connecting or disconnecting the driving connection between the shaft and the pulley, as may be required. Pulley 37 is driven from an electric motor or other suitable prime mover 39 by means of a belt or the like 40, and the clutch 38 is controlled by means of a control rod 41 associated with a foot treadle 42 pivotally mounted on the leg support 12. A spring 43 normally holds the control rod 41 in lowered position operating the clutch so as to disconnect the driving connection between the pulley 37 and the drive shaft 36. By means of the connections described, it will be seen that as the operator depresses the foot treadle 42, the control shaft 41 may be raised, connecting clutch 38, and causing the inner electrode roller 33 to be driven from the motor 39.

It is to be understood, as shown in Fig. 1, that the inner electrode roller is associated with the other branch of the welding transformer secondary through electrical connection therewith, for example through the intermediary of the bracket 30, as shown.

Referring more particularly to Fig. 4, illustrating the position of the parts at the welding station, and also showing the details of the coupling connection in accordance with one embodiment of the invention, it will be seen that this illustrated embodiment comprises a metal tube 14 of the flexible annularly corrugated type and an associated coupling piece or fitting 50 of generally cylindrical shape and provided with a threaded end portion 51. It is to be understood that the fitting 50 may comprise any sort of tubing piece, end connection, or other member or piece to be secured, in accordance with the requirements of the particular installation. The end 14a of the tubing may be secured to the end of the coupling piece in any suitable manner, for example by means such as set forth in the copending application of David Wendell Fentress, Serial No. 291,139, filed August 21, 1939.

The metallic braid 15, provided with tubing of this character for reinforcing and protective purposes, in accordance with the present invention is adapted to be electric seam resistance welded in the coupling connection, and to that end, referring further to Fig. 4, the end 15a of the braid is adapted to be brought between the electrode rollers 20 and 33 in encompassing relation with the end of the coupling fitting 51. It will be seen that if the outer electrode roller is lowered, clamping the braid and the coupling between the electrode rollers 20 and 33, and current then passed between the electrodes, for example by the closing of the transformer switch, diagrammatically indicated at 53, Fig. 1, a spot weld will be formed in the braid and between the braid and the coupling fitting. If the inner electrode roller is driven from the motor 39 during the continuous or intermittent passage of the current, an electric seam resistance weld either continuous or intermittent will be produced extending circumferentially of the coupling connection.

Also in accordance with the invention and in the embodiment shown, the welded end of the braid is adapted to be encompassed within a metal sleeve, as indicated at 54, Fig. 4, which latter serves to protect, finish and reinforce the end connection. In the apparatus shown, this sleeve is fed to the welding station in ribbon form by means now to be more particularly described.

Referring to Figs. 2 and 3, it will be seen that the electrode shaft 32 is provided at an intermediate point thereon with a gear 55. This gear drives a gear 56 which in turn drives a gear 57 loosely mounted on a feed roll shaft 58 and adapted to be selectively clutched thereto by means of a clutch device 59. The gear 57 will be rotatably driven whenever the shaft 32 is rotated, but the shaft 58 will be rotated with gear 57 only when manually operable clutch 59 is closed. Shaft 58 carries a gear 60 adapted to drive gears 61 and 62, the latter being associated with and secured to a cutter shaft 63, the arrangement being such that the cutter shaft is driven at all times synchronously with shaft 58. The feed roll shaft 58 is adapted to drive a pair of feed rolls 65 associated with the sleeve ribbon 54, and the cutter shaft 63 is adapted to drive a pair of cutter rolls 66, also associated with the sleeve ribbon, and provided at one point on their periphery with cooperating cutting devices. It will be seen that when the clutch 59 is disengaged, the electrode shaft 32 may be driven independently but when the clutch is engaged the feed and cutter rolls 65 and 66 will be operated synchronously with the electrode shaft whereby to feed the sleeve ribbon 54 to the welding station and also periodically sever the ribbon into suitable predetermined lengths.

In the operation of the illustrated apparatus, the tube, coupling fitting, braid and the end of the sleeve ribbon 54 are first introduced between the electrode rollers, and the outer roller then lowered into clamping position by manipulation of the handle 21, causing the parts to assume the position as illustrated in Fig. 4. As the clutch 38 is then closed and the welding current preferably continuously applied, a circular seam resistance weld will be produced, welding the sleeve ribbon to the braid and the braid to the coupling fitting, as indicated at 70 and 71 in Fig. 6. Also, assuming the clutch 59 to be closed, the sleeve ribbon 54 will be fed at the proper speed to the welding station and severed by the cutter rolls 66 into a length producing a slight overlap of the ribbon ends as they are brought into encompassing relation around the braid. By disengagement of clutch 59, the electrode shaft 32 may be operated independently of the ribbon feed devices, and by this means it will be seen that if desired a series of spot welds or a circular seam weld may be produced between the braid and the coupling fitting before the application of the sleeve ribbon. Such a spot weld is indicated at 72 in the perspective view, Fig. 5, and may in certain instances be utilized as a preliminary holding means for retaining the braid in position during the circular seam welding operation.

Referring more particularly to Fig. 6, it will be noted that not only are the welds as indicated at 70 and 71 produced, but also the various individual wire strands of the braid itself are welded to each other, as indicated at 73, thereby forming the braid along the periphery of the weld in effect into a rigid sleeve-like structure, continuous in the embodiment shown; adding to the rigidity and effectiveness of the connection. This welding of the braid wires to each other takes place in an instantaneous manner without excess heating or deterioration of the metal fibers. Their tensile strength is preserved.

The ribbon 54 is preferably of sufficient thickness so that it has the required body, but at the same time it is sufficiently thin so that it may be distorted by the pressure of the electrode wheel as indicated at 54a, Fig. 6, whereby to produce a localized area of contact with the braid and localize the welding area. If the sleeve were not deformable in this manner, incomplete welding might take place over an uncontrolled area substantially equal to the width of the ribbon. A ribbon thickness on the order of .020 inch may, for example, be employed where the ribbon is of such metal as stainless steel, a metal well suited for welding operations such as here contemplated.

The methods and means for securing the braid by electric seam resistance welding, in accordance with the present invention, are to be sharply contrasted with more cumbersome methods and means heretofore used involving attempts to mechanically clamp the braid end in the desired position. The present methods produce a positive bond, both between the metal fibers of the braid and between the braid and the coupling fitting and the encompassing sleeve, where used. The strength of the welded connection is limited only by the strength of the welded metals themselves. The welding action, even as between the individual wire strands, takes place rapidly so that there is no detrimental softening of the metal fibers or loss of tensile strength. There is no danger of undue heating of the metal parts, resulting in the detrimental softening thereof, such as is possible in brazing or soldering operations where flames, torches and the like are used. Further, no foreign metals are included in the connection which are subject to corrosive attack. The welding may be quickly and economically effected.

In Fig. 7 an embodiment is illustrated wherein the outer encompassing sleeve, such as the sleeve ribbon 54, is eliminated. In the welding of the braid end, both as shown in Fig. 7 and also in the previously described embodiment of the invention, the circumferential weld indicated by the numeral 76 in Fig. 7 is spaced somewhat from the extreme end of the braid, thereby leaving a short extension of unwelded braid ends 77. In the embodiment shown in Fig. 4, these are covered by the sleeve ribbon 54. In accordance with Fig. 7, wherein the outer sleeve is not used, these end extensions may be trimmed off by a suitable lathe tool such as indicated diagrammatically by numeral 78. If desired, the line of weld may be coincident with the extreme braid end but it is preferred to space the line of weld somewhat inwardly from the extreme end of the braid, as shown in Figs. 4, 5, 6 and 7, whereby to insure that the ends of the braid will not be squeezed out of position during the circumferential welding operation.

In Fig. 8 a further embodiment is illustrated wherein the outer sleeve instead of being in the form of a ribbon, as previously described, is in the form of a machined rigid cylindrical sleeve 80, provided on its outer periphery with polygonal shaping or projections 81 suitable for the reception of a wrench or the like. The inner bore of the sleeve may also be cut away, as indicated at 82, whereby to produce a pair of welding surfaces 83 and 84 of limited width, localizing the welded areas for reasons previously described in reference to Fig. 6. In this embodiment of the invention the braid 15 is interposed between the sleeve 80 and the coupling fitting, and the circular welding then effected to secure the braid in position as in the previously described embodiments of the invention. Preferably in this instance two circumferential welds, as indicated at 85 and 86, are provided. This double welding produces a firm connection between the sleeve 80 and the fitting 50, producing an integral construction so that a wrench may be applied to the sleeve for the purpose of introducing the coupling fitting into screw threaded connection with a mating coupling element.

It is obvious that various changes may be made in the specific embodiments set forth for purposes of illustration without departing from the spirit of the invention. Accordingly, the invention is not to be limited to the precise embodiments shown and described but only as indicated in the following claims.

The invention is hereby claimed as follows:

1. A coupling connection comprising a metal hose, a coupling member secured to the hose end, and a metallic braid in encompassing relation on the hose, the end of the braid also being in encompassing relation upon the coupling member, the wire strands of the braid being relatively welded together along a predetermined annular band portion thereof to form a rigid braid structure and the braid being welded to the coupling member by weld means arranged circumferentially of the structure.

2. A coupling connection comprising a metal hose, a coupling member secured to the hose end, a metallic braid in encompassing relation on the hose, the end of the braid also being in encompassing relation upon the coupling member, and a braid sleeve in encompassing relation upon the braid, the sleeve being welded to the braid, the braid fibers being welded together along a predetermined annular band portion thereof to form a rigid braid structure, and the braid being welded to the coupling member by weld means arranged circumferentially of the structure.

3. A coupling connection as defined in claim 2, wherein the braid sleeve comprises a ribbon-like member wrapped circumferentially of the structure.

4. A coupling connection as defined in claim 2, wherein the braid sleeve comprises a ribbon-like member wrapped circumferentially of the structure, the width of the sleeve being greater than the width of the weld line, and the ribbon-like member being of relatively thin gauge and being radially inwardly depressed along the area of the weld line.

5. A coupling connection comprising a metal hose, a coupling member secured to the hose end, a metallic braid in encompassing relation on the hose, the end of the braid also being in encompassing relation upon the coupling member, and a braid sleeve in encompassing relation upon the braid, the sleeve being welded to the braid, the braid fibers being welded together along a predetermined annular band portion thereof to form a rigid braid structure, and the braid being welded to the coupling member by weld means arranged circumferentially of the structure, said braid sleeve comprising a preformed substantially rigid sleeve-like member.

6. A coupling connection as defined in claim 5, wherein said preformed substantially rigid sleeve-like member is provided with a polygonally shaped wrench-receiving circumferential surface and a circumferential flange surface laterally projecting from said polygonally shaped circumferential surface, said flange surface being welded to the braid by said weld means.

DAVID WENDELL FENTRESS.
SIDNEY JOHN HUGHES.